United States Patent
Manning

(10) Patent No.: US 7,193,184 B1
(45) Date of Patent: Mar. 20, 2007

(54) IMPINGEMENT OVEN WITH RADIANT HEATING

(76) Inventor: Michael Manning, 1475 Lawrence St., Suite 400, Denver, CO (US) 80202

( * ) Notice: Subject to any disclaimer, the term of this patent is extended or adjusted under 35 U.S.C. 154(b) by 0 days.

(21) Appl. No.: 11/102,353

(22) Filed: Apr. 7, 2005

Related U.S. Application Data

(60) Provisional application No. 60/521,355, filed on Apr. 8, 2004.

(51) Int. Cl.
A21B 1/14 (2006.01)
A21B 1/26 (2006.01)
A21B 1/48 (2006.01)
F27B 9/36 (2006.01)

(52) U.S. Cl. ............ 219/388; 219/400; 219/405; 219/411; 99/443 C

(58) Field of Classification Search ............ None
See application file for complete search history.

(56) References Cited

U.S. PATENT DOCUMENTS

| | | | | |
|---|---|---|---|---|
| 4,336,279 A | * | 6/1982 | Metzger | 427/521 |
| 4,374,319 A | * | 2/1983 | Guibert | 219/400 |
| 4,951,648 A | * | 8/1990 | Shukla et al. | 126/21 A |
| 5,934,178 A | * | 8/1999 | Caridis et al. | 99/330 |
| 6,259,064 B1 | * | 7/2001 | Wilson | 219/400 |
| 6,320,165 B1 | * | 11/2001 | Ovadia | 219/400 |
| 6,369,360 B1 | * | 4/2002 | Cook | 219/388 |
| 6,686,566 B1 | * | 2/2004 | Corey | 219/388 |

FOREIGN PATENT DOCUMENTS

| JP | 60-120973 | | 6/1985 |
|---|---|---|---|
| JP | 60120973 A | * | 6/1985 |

* cited by examiner

*Primary Examiner*—Joseph Pelham
(74) *Attorney, Agent, or Firm*—Jeffrey D. Myers; Peacock Myers, P.C.

(57) ABSTRACT

An oven for providing radiant and impingement heat to a food item. The oven includes a fan mechanism for drawing air around the radiant heat elements of the oven. The air is then delivered to an impingement tray located adjacent the food item. The air is forced through a series of apertures and onto the food item. At the same time the oven is also being heated by the radiant heat elements. This allows greater heat to be applied to specific locations on the food item. An external heat source is not required to heat the air as the air is heated by the existing radiant heat elements.

11 Claims, 3 Drawing Sheets

IMPINGEMENT OVEN WITH RADIANT HEATING

CROSS-REFERENCE TO RELATED APPLICATIONS

This application claims the benefit of the filing of U.S. Provisional Patent Application Ser. No. 60/521,355, entitled Impingement Oven With Radiant Heating, filed on Apr. 8, 2004, and the specification thereof is incorporated herein by reference.

BACKGROUND OF THE INVENTION

1. Field of the Invention (Technical Field)

This invention relates to the field of ovens and particularly to the field of impingement ovens.

2. Background Art

Toaster ovens have been popular to heat food, including sandwiches, pizzas and other items, for some time. These toaster ovens typically incorporate heating elements that radiate heat to toast or warm the food items. Over the years improvements to those conventional toaster ovens have included microwave ovens that utilize microwave energy to heat the food, and convection ovens that utilized forced air blown over and around the food. Problems have arisen with these ovens as different portions of the food items may require different heat at different times. For example, in toasting open face sandwiches, the bread will often become too crispy or even burned before the cheeses and meats have reached the desired temperature. Another example with sandwiches is that the bread becomes soft or even soggy from the effects of microwave oven cooking.

One improvement to these ovens to solve this problem is the creation of conveyor ovens. These ovens convey the food item through the oven at a set rate or under the direction of an operator to better ensure even heating of the items. However, these types of ovens do not operate particularly well with microwave or convection ovens, and still fail to ensure that different portions of the food item are heated properly.

Another solution to these problems was the creation of impingement ovens. Impingement ovens that blow forced columns of hot air or vapor at localized areas of the food were also created particularly to bake pizza. These ovens are particularly useful to ensure heating at specific locations of the food item.

Impingement ovens have also recently been utilized with conveyors for use in heating food items such as pizza or sandwiches. Examples of typical impingement conveyor ovens include ovens manufactured by Star Manufacturing International, Inc., Holman Cooking Equipment Division, by Lincoln Food Services, Inc. and by Middleby Marshall. These ovens include conveyors that pass the food item by impingement jets of forced hot air.

However, these ovens do not solve the problem of ensuring proper toasting of bread and other particular issues. One issue that arises in using impingement ovens or radiant heating ovens with bread items is that the edges of bread or crust, particularly where those edges are exposed differently than the bottom surfaces, tend to become crispy or burnt at a faster rate than the bottom surfaces.

These and other problems exist in the current technology associated with ovens. Thus, a need arises in providing an oven that allows for consistent heating or toasting of food items with minimal operator control.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

A preferred embodiment of the present invention is illustrated in FIGS. 2–6. It is to be expressly understood that the descriptive embodiment is provided herein for explanatory purposes only and is not meant to unduly limit the claimed inventions. Other embodiments of the present invention are considered to be within the scope of the claimed inventions, including not only those embodiments that would be within the scope of one skilled in the art, but also as encompassed in technology developed in the future. Although open-faced sandwiches are often used as an example of the food item being used with this invention, these are discussed primarily for the purposes of understanding the method of operation. It is to be expressly understood that other food items are contemplated for use with the present invention as well.

As will be understood by those familiar with the art, the present invention may be embodied in other specific forms without departing from the spirit or essential characteristics thereof. For example, the present invention is not limited in the number or position of impingement locales throughout the oven compartment. Accordingly, the disclosure of the preferred embodiment of the invention is intended to be illustrative, but not limiting, of the scope of the invention which is set forth in the following claims.

Figure 1:
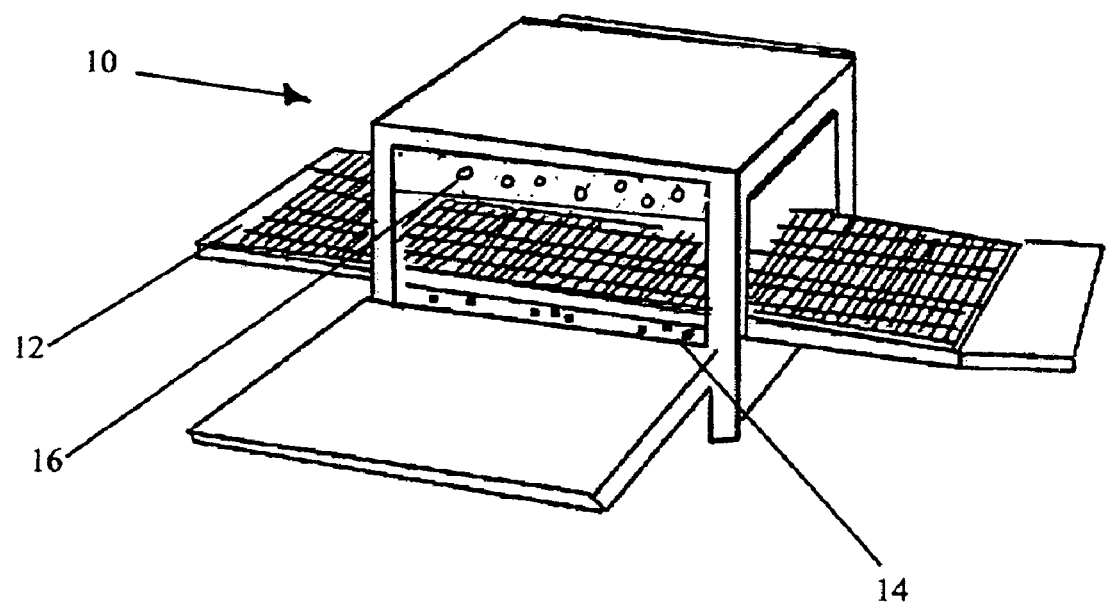
FIG. 1 is an illustration of a radiant heat conveyor oven according to the prior art.
Figure 2:
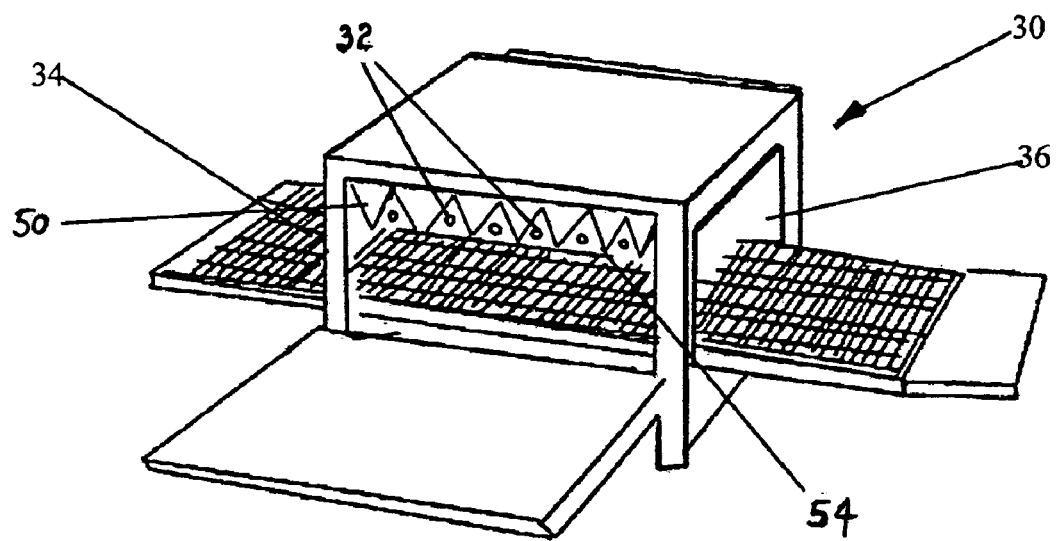
FIG. 2 is a perspective view of a preferred embodiment of the present invention.

An example of a prior art conveyor oven is illustrated in FIG. 1. The oven 10 includes a conveyor 12 that passes under and over radiant heat elements 14, 16. The prior art oven fails to properly heat the edges of the bread or crust without burning those edges while adequately heating the other portions of the food item, such as pizza sauce, cheese, toppings or sandwich meat and cheese toppings. Thus the food item is not optimally prepared.

A descriptive preferred embodiment of the present invention is illustrated in FIGS. 2–6. The oven 30 of a preferred embodiment of the present invention utilizes radiant elements 32 within the oven compartment 36 that provide radiant heat to the food item as it is conveyed on wire mesh conveyor 34 through the oven compartment. The radiant heat elements 32 extend along the upper portion of the oven compartment 36 to radiate heat onto the sandwich, pizza or other food item as it passes through the oven. It is to be expressly understood that radiant heat elements may also extend along the sides of the oven compartment 36, or near its bottom under the conveyor 34. Although the drawing figures show the oven 30 as open sided for descriptive purposes, it is to be understood that the oven in operation will be closed on the sides.

Figure 3:
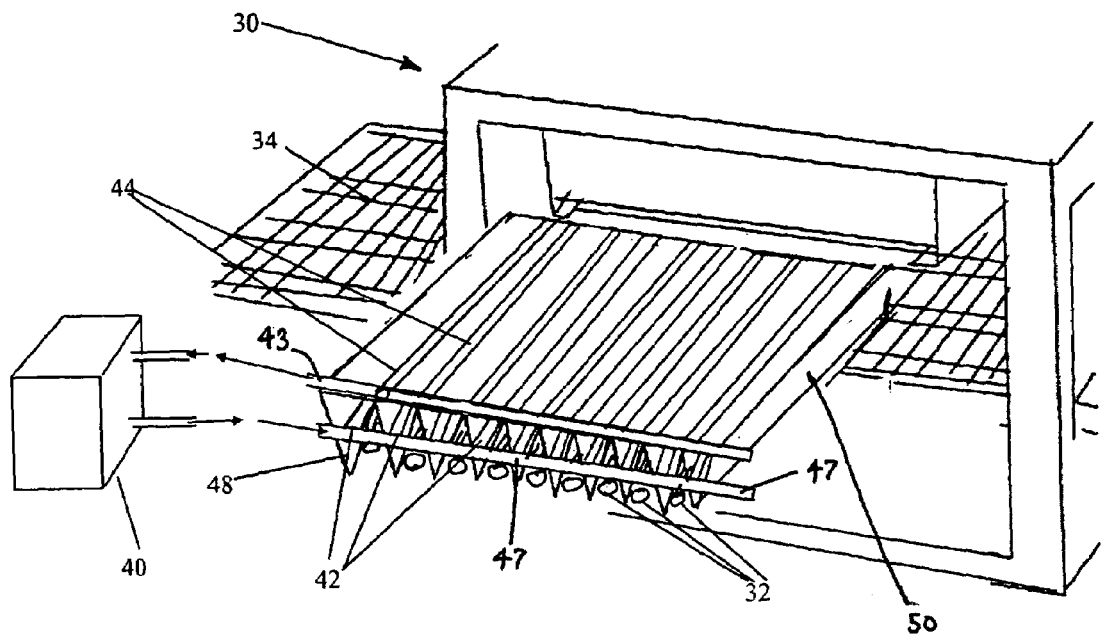
FIG. 3 is partially exploded view of the embodiment of FIG. 2.
Figure 5:
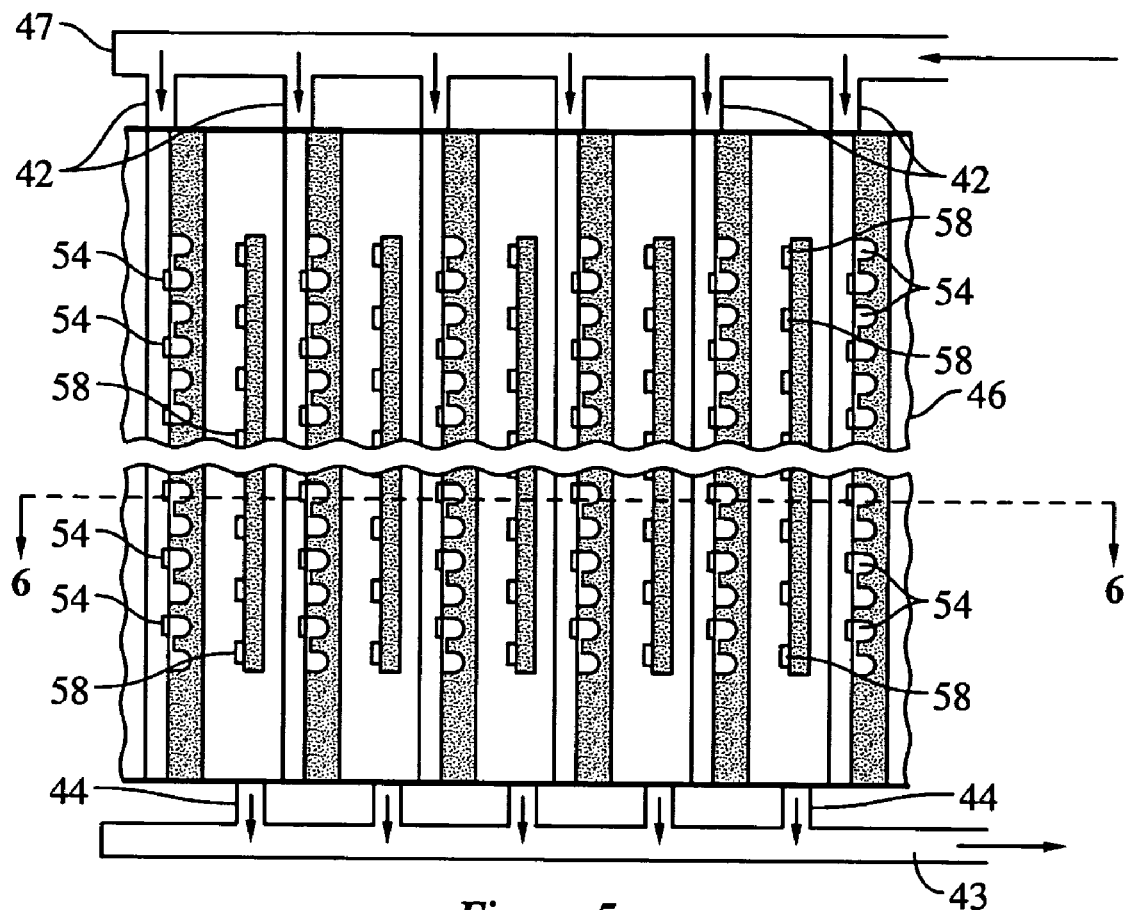
FIG. 5 is plan view of the wave impingement tray of a preferred embodiment of the present invention.
Figure 6:
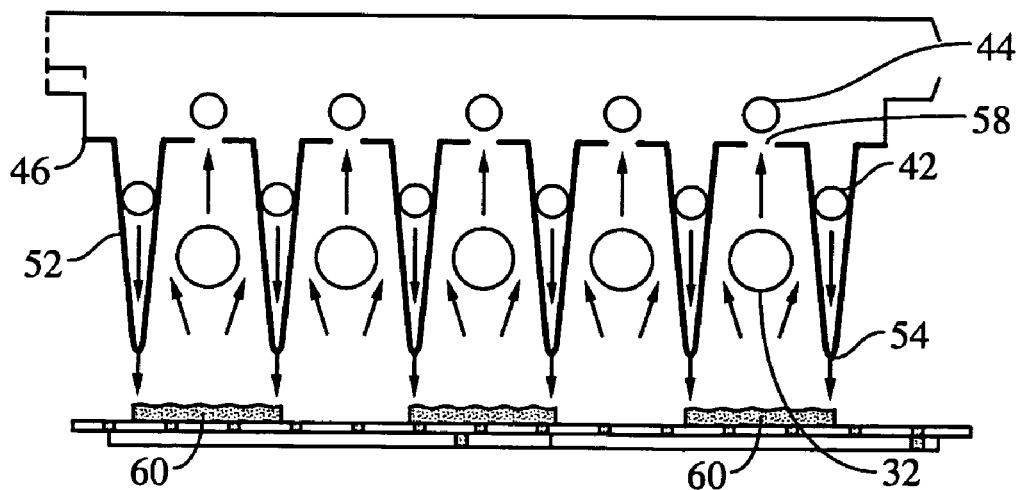
FIG. 6 is a cross-sectional side view of the tray of FIG. 5, taken along section line 6—6 in FIG. 5.

Combined reference is made to FIGS. 3, 5 and 6. In the preferred embodiment, a fan 40 located on the exterior of the oven compartment 36 draws air past the radiant heat elements 32 and into the perforated connecting tubes 44. The connecting tube segments which are within the oven compartment 36 are perforated with apertures directed toward the interior of the compartment 36 (i.e., on the bottom side of the tubes 44 as seen in FIG. 6). The air is heated as it passes over and around the radiant heat elements 32, and then up into the connecting tubes 44 as shown by the directional arrows in FIG. 6. The heated air then flows into and through connecting tubes 44 which are connected to outtake manifold 43. Outtake manifold 43 is operatively connected to and in fluid communication with the fan 40. The fan 40 draws the heated air from tubes 44 (via the outtake manifold 43) and then forces it into the intake manifold 47 for conveyance to the inlet tubes 42. Inlet tubes 42 extend along and in parallel adjacency to the tray 50 that is mounted above the conveyor 34. The inlet tube segments that are within the oven compartment 36 are perforated with apertures directed toward the interior of the compartment 36 (i.e., downward in FIG. 6, as indicated by the directional arrows).

The tray 50 is perforated with a series of apertures 54 that proximate to the food item 60 as it passes through the oven compartment 36. Thus, after the air is drawn by the fan 40 past the radiant heat elements 32 and into the connecting tubes 44, it is forced through the inlet tubes 42 and then directed to the apertures 54 to be directed toward and impinge onto the food items 60 as they pass through the oven compartment 36. The impingement of the heated air on the food item promotes the proper warming of the food without burning the edges.

The apertures 54 are located so that the food elements 60 such as the meat, cheese and other toppings on the sandwich, pizza or other food item are impinged by the hot air jets emitting from the apertures 54. The bread or crust are toasted or baked by the radiant heat elements 32 while the toppings are heated by both the radiant heat elements and the impingement of the hot air being ejected from the apertures 54. The impingement tray 50 may be flat, or may have other configurations such as the one described in greater detail below.

This oven 30 utilizes the radiant heat elements 32 to heat the air thus providing a more efficient oven than previous impingement ovens that require an additional heat source to heat the air. The radiant heat elements 32 also radiate heat to toast the bread and further heat the toppings.

Another feature of the preferred embodiment of the present invention is the use of a wave tray 50 to direct and reflect the radiated heat from the radiant elements 32 as well as the hot air from the apertures 54. Wave tray 50, as shown in FIGS. 5–6, has a pleated cross-sectional configuration, and includes a series of downwardly extending pleats or waves 52. Apertures 54 are formed in the peak of each of the pleats or waves 52. The tray 50 also is perforated with apertures 58 formed in the valley of each of the pleats or waves 52 as well.

As seen in FIG. 6, the radiant heat elements 32 are mounted in the valleys of the wave tray 50. Consequently, the radiant heat from those elements 32 reflects off the angled, mostly vertical side surfaces of the waves 52 and onto the food items 60 on the conveyor tray 34. The connecting tubes 44 are mounted on or above the upper surface of the wave tray 50 directly above and generally parallel to the radiant heat elements 32. Because the fan 40 draws air through the connecting tubes 44, the air flows upward and around the radiant heat elements 32 as shown in FIG. 6, through the apertures 58 and into the connecting tubes 44. The air is heated as it flows around the radiant heat elements 32. This heated air is transported through connecting tubes 44 and into the manifold 43 by the action of the fan 40.

The heated air is then blown through the inlet tubes 42 that extend in the peaks of the waves 52 as shown in FIG. 6. This heated air flows out apertures in the inlet tubes 42 that are aligned with the apertures 54 in the peaks or lower surfaces of the wave tray 50. The apertures in the inlet tubes 42 and the apertures 54 in the wave tray 50 are of a smaller diameter than the collecting apertures in the connecting tubes 44 and apertures 58 of the wave tray to minimize any back pressure in the system. These smaller apertures in the inlet tubes 42 also create a jet like effect to force a blast of hot air downward onto the food items 60 on the conveyor tray 34.

Figure 4:
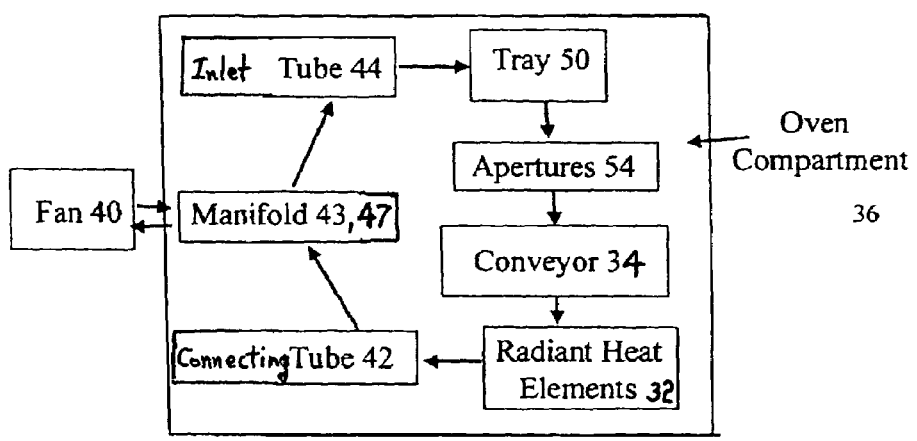
FIG. 4 is a schematic illustration of the embodiment of FIG. 3.

The unique impingement process of a preferred embodiment of the present invention is described schematically in FIG. 4. Air is drawn over and around the radiant heat elements 32 and through connecting tubes 44 by the force of the fan 40 pulling through manifold 43. The heated air is forced through the manifold 43 and into inlet tubes 42. Inlet tubes 42 extend along the waves 52 of tray 50. The air is then forced down through apertures 54 in the tray 50. The apertures 54 preferably are located proximate to the food items 60, to impinge the hot air directly onto the toppings of the sandwich, pizza or other food items. FIG. 4 illustrates diagrammatically that all the principal elements of the apparatus, excepting the fan 40, preferably are situated within the oven compartment 36.

In one preferred embodiment, and as suggested in FIG. 6, the distance from the apertures 54 to the food items 60 substantially exceeds the distance from the heating elements 32 to the food items, so that air ejected from the apertures 54 does not interfere with air flowing in the opposite direction toward connecting tubes 44.

This localized blast of hot air from apertures 54 displaces cooler air around those toppings 60 and provides additional heat to raise the temperature of those toppings. The air continues to circulate downward, sideways and even upwards to circulate around the radiant heat elements 32 and back into the connecting tubes 44. The tubes 42, 44 may be contained within the oven compartment 36 to further heat the air. Only the fan 40 and portions of the manifold 43 preferably are located outside the oven compartment 36.

The wave tray 50 also reflects the radiant heat from the radiant heat elements 32 and the impingement jets 54 to minimize the burning of the exposed edges of the bread or crust. Thus the oven 30 may heat the toppings at a greater temperature than the bread or crust to provide an optimal sandwich or pizza.

These and other embodiments are not meant to limit the scope of the claims. These and other variations are considered to be within the scope of the claimed invention.

What is claimed is:

1. An oven for heating food items, said oven comprising:
    a fan for blowing air;
    at least one radiant heating element, disposed within an oven compartment, for heating a food item in said compartment;

a first perforated tube adjacent to said heating element and in operative connection with said fan for conveying air from said oven compartment;

a second perforated tube proximate to the food item and in operative connection with said fan for conveying air into said oven compartment;

a conveyor to pass food items through said oven compartment; and a perforated tray adjacent to said at least one radiant heating element for directing the flow of air in said oven compartment; and wherein said fan draws air past said at least one radiant heating element and into said first perforated tube thereby heating the air, and wherein said fan ejects air from said second perforated tube to direct heated air on to the food item.

2. The invention of claim 1 wherein said tray comprises apertures for directing heated air toward the food item.

3. The invention of claim 2 wherein said tray is substantially flat.

4. The invention of claim 2 wherein said tray is pleated to define a series of peaked wave portions, and wherein said apertures are located at peaks of said wave portions.

5. The invention of claim 1 wherein said tray is located above said conveyor.

6. The invention of claim 1 wherein said tray is located underneath said conveyor.

7. The invention of claim 6, further comprising a second tray located above said conveyor.

8. A method for heating food items comprising the steps:

passing a food item through an oven compartment;

heating the food item with a radiant heating element in the compartment;

heating air in the compartment by drawing it past the heating element;

disposing a reflecting surface in the compartment adjacent said the heating element; and directing the heated air through apertures in the reflective surface and impinging the air directly onto the food item; and wherein disposing a reflective surface comprises disposing a pleated reflecting surface having a series of peaked wave portions and locating the apertures at peaks of the wave portions.

9. The invention of claim 8 wherein disposing a reflective surface comprises the step of locating a reflective surface above a food item.

10. The invention of claim 8 wherein disposing a reflective surface comprises the step of locating a reflective surface underneath a food item.

11. The invention of claim 8 wherein disposing a reflective surface comprises the steps of locating a first reflective surface above a food item and a second reflective surface underneath a food item.

* * * * *